United States Patent [19]

Glasauer et al.

[11] Patent Number: 4,558,245
[45] Date of Patent: Dec. 10, 1985

[54] ELECTRONICALLY COMMUTATED D.C. MOTOR

[75] Inventors: Rudolf Glasauer; Josef Feigel, both of Landshut, Fed. Rep. of Germany

[73] Assignee: International Standard Electric Corporation, New York, N.Y.

[21] Appl. No.: 598,956

[22] Filed: Apr. 11, 1984

[30] Foreign Application Priority Data

Apr. 20, 1983 [DE] Fed. Rep. of Germany ....... 3314239

[51] Int. Cl.[4] .............................................. H02K 7/00
[52] U.S. Cl. ..................................... 310/67 R; 310/42; 310/68 R; 310/156; 310/194; 310/DIG. 6; 29/596
[58] Field of Search ............... 310/67 R, 46, 181, 156, 310/194, 193, 216, 218, 254, 259, 70 R, 70 A, 68 R, 68 B, 177, DIG. 6, 41, 91; 29/596; 318/138, 254

[56] References Cited

U.S. PATENT DOCUMENTS

| 2,172,191 | 9/1939 | Denman | 310/216 |
| 2,194,046 | 3/1940 | Langer | 310/46 |
| 4,074,157 | 2/1978 | Lace | 310/194 |
| 4,115,715 | 9/1978 | Muller | 310/67 |
| 4,438,362 | 3/1984 | Brown | 310/156 |

FOREIGN PATENT DOCUMENTS

| 2612464 | 8/1977 | Fed. Rep. of Germany . | |
| 2712824 | 9/1978 | Fed. Rep. of Germany .... | 310/67 R |
| 2225442 | 9/1979 | Fed. Rep. of Germany . | |
| 1392582 | 4/1975 | United Kingdom ............. | 310/67 R |

Primary Examiner—R. Skudy
Attorney, Agent, or Firm—T. L. Peterson; J. S. Christopher

[57] ABSTRACT

An electronically commutated d.c. motor having a dome-shaped external rotor and a stator of a double-T-shaped configuration. Stator includes one yoke stack disposed asymmetrically in relation to the longitudinal stator axis. In addition, the stator includes two pole stacks each of which is provided on the same side with an extension in the circumferential direction. A printed circuit board is secured to a mounting flange of the d.c. motor.

13 Claims, 9 Drawing Figures

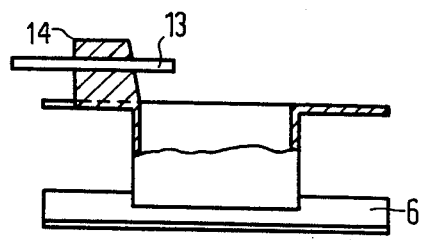
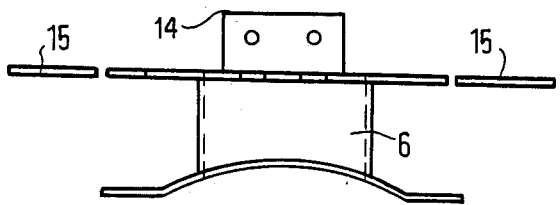
Fig. 5a  Fig. 5b
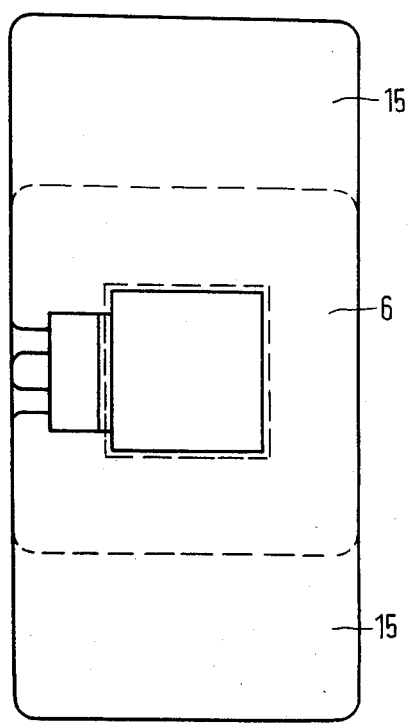
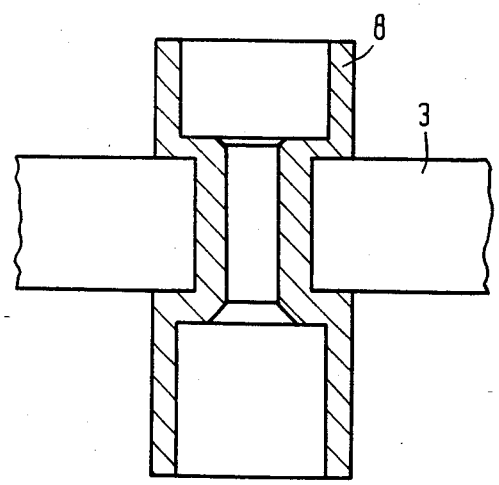
Fig. 5c  Fig. 6

ELECTRONICALLY COMMUTATED D.C. MOTOR

BACKGROUND OF THE INVENTION

1. Field of the Invention

The present invention relates to an electronically commutated direct current (d.c.) motor comprising a permanent-magnetic rotor consisting of a dome-shaped body of magnetizable material and of a permanent magnet disposed on the inner circumference thereof, and further comprising a stator provided with a winding producing an alternating current field, with the stator having a double-T-shaped design, and with the stator winding being disposed on the common leg of the double T.

2. Description of the Prior Art

Such types of d.c. motors are known (for example from German Patent Applications DE-AS Nos. 22 25 442 and 26 12 464).

These motors are single-stranded coil type two-pulse current supplied, commutatorless and permanently energized d.c. motors having an external rotor. Upon supplying the stator winding with current, these d.c. motors are capable of being restarted automatically from the standstill if only a small braking torque exists at the motor shaft. The supply of current to the stator winding is effected in these types of d.c. motors in dependence upon the rotational position of the rotor. The rotor position is ascertained by a sensor, such as a Hall generator, with a signal obtained from the sensor utilized to control an electronic circuit which applies a source of direct current voltage to the stator winding for forming the required starting torque.

These types of d.c. motors all have one drawback which finds its expression in the difficulties of generating a starting torque. In these d.c. motors, with the aid of the electronically controlled stator winding, there is produced a stator alternating current field which, in cooperation with the exciting field of the permanent magnet, forms a pulsating moment. In cases where both the polar axis of the permanent magnet and the polar axis of the alternating current field are not displaced in relation to one another, the torque equals zero. Under these conditions the rotor is prevented from starting on its own.

The forming of a starting torque requires an angle differing from zero to exist between the polar axis of the permanent magnet and the polar axis of the stator alternating current field. This means to imply that in the case of a currentless stator winding, the polar axis of the permanent magnet must be displaced by a certain angle of rotation with respect to the polar axis of the stator alternating current field.

This necessary displacement of the rotor with respect to the stator in the rest position of the motor is realized in the conventional type of d.c. motor by an asymmetrical air gap between the stator and the rotor, which is variable in the circumferential direction. The magnetic resistance of the air gap, which is not constant along the circumference of the motor, results in the permanently excited rotor, owing to the asymmetry of the air gap, being displaced with respect to the polar axis of the stator by an angular amount. The possibility of optimizing this angle by the corresponding design of the air gap is restricted because this action simultaneously reduces the utilization of the permanent magnet.

The stator of the conventional type of d.c. motor is made from a one-piece sheet steel lamination. The stator winding is wound onto the stator lamination stack as composed of this sheet steel lamination. This type of stator winding, however, is costly and involves a considerable investment. Moreover, it is not suitable for use in automatic production.

SUMMARY OF THE PRESENT INVENTION

It is the object of the present invention to further develop the conventional type of d.c. motor such that the phase displacement of the rotor with respect to the stator in the rest position of the motor becomes as large as possible without causing any deterioration of the magnetic air gap conductance. Moreover, the novel d.c. motor is designed such that its individual parts are suitable for automatic production and that the d.c. motor can be assembled in a cost-effective manner.

According to the invention, the object is achieved in that the stator windings include a yoke and a plurality of two pole stacks which are disposed asymmetrically in relation to a longitudinal stator axis. The pole stacks are designed such that a constant air gap is created between the stator and the rotor. Each pole stack is provided on the same side with an extension in the circumferential direction, and each of the stator windings is wound onto a respective coilform to be disposed on the yoke stack.

IN THE DRAWING

Further advantageous embodiments of the invention are set forth in the subclaims and are explained hereinafter with reference to some preferred embodiments shown in FIGS. 1 to 7 of the accompanying drawings, in which:

FIG. 1 is a top view of both the rotor and stator of the novel d.c. motor,

FIG. 2 is a partial sectional elevation taken through the d.c. motor as shown in FIG. 1, FIG. 3 shows a design of the stator lamination stack, FIG. 4 is a sectional elevation of the rotor, FIGS. 5a to 5c illustrate different views of the coilform for taking up the stator winding, FIG. 6 is a sectional elevation of the rotor bearing and, FIG. 7 shows a d.c. motor comprising a different type of rotor.

DETAILED DESCRIPTION OF THE PREFERRED EMBODIMENT

Figure 1:
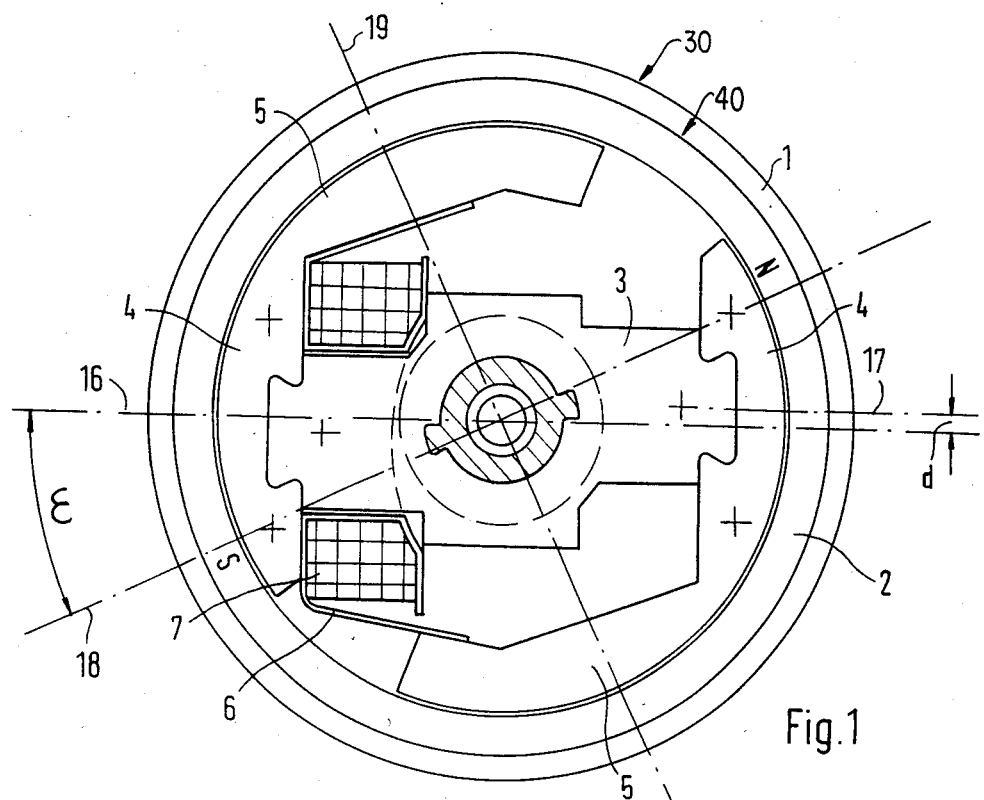

FIG. 1 shows a rotor 40 and a stator 50 of a novel d.c. motor 30 as seen from one end face after both a mounting flange 9 (FIG. 2) and a printed circuit board 10, containing an electronic circuit required for the commutation, have been removed. The illustrated d.c. motor 30 is a bipolar external rotor type of motor. The rotor 40 includes a dome-shaped body 1 of magnetizable material, such as soft iron, on the inner circumference of which a permanent magnet 2, such as a plastics bound plate-shaped permanent magnet is inserted and magnetized with the polarity as indicated.

The stator 50 includes three lamination-stack parts, namely a yoke stack 3 and a plurality of two pole stacks 4 which are in a form-fit connection with one another owing to the employment of dovetailed fitting units. Each of the pole stacks 4 not only has the shape of a mushroom cap as previously known from double-T rotor windings, but each pole stack 4 is provided on the same side in the circumferential direction, with an extension 5 which, in the given example of the preferred embodiment, mechanically extends over about 70 angular degrees, so that each pole stack 4 mechanically extends over approximately 150 angular degrees. The yoke stack 3 carries a plurality of coilforms 6 with a plurality of stator windings 7. (In FIG. 1 there is only shown one coilform 6 and one stator winding 7.) As is moreover evident from FIG. 1, the motor 30 has a longitudinal stator axis 16 which is the longitudinal axis of symmetry through the motor 30. Note that the stator windings 7 are disposed asymmetrically in relation to the longitudinal stator axis 16. The stator alternating current field includes a polar axis 17 which is staggered parallel in relation to the longitudinal stator axis 16 by the space d. The permanent magnet 2 within the rotor 40 includes a polar axis 18. At a right angle to the polar axis 18, there is a neutral zone 19. In FIG. 1, the polar axis 18 of the permanent magnet 2 is shown in the position which it assumes when the stator winding 7 is not supplied with current. In that case, the polar axis 18 of the permanent magnet 2 is displaced by an angle ε with respect to the polar axis 17 of stator alternating current field.

Figure 2:
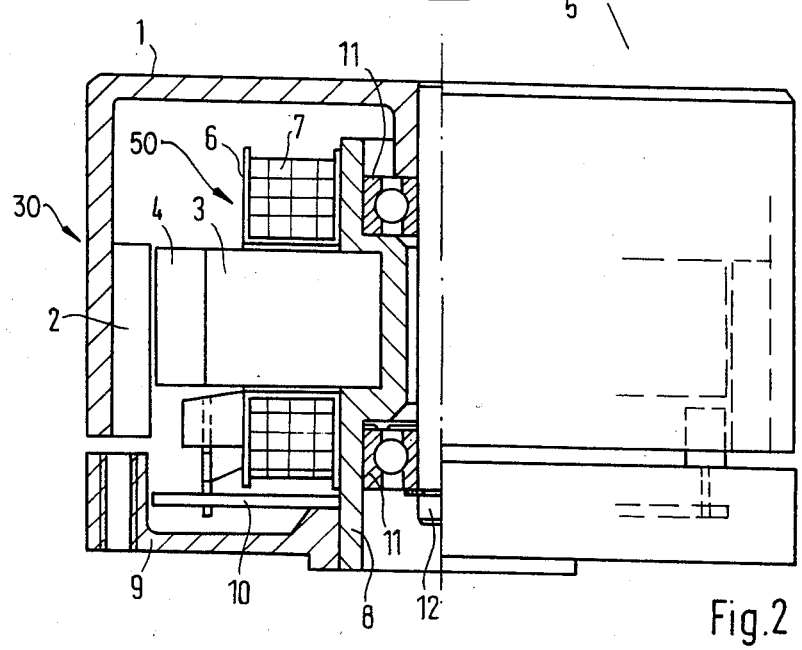

As can be recognized from FIG. 2, the stator 50 is mounted in a sleeve-shaped bearing support 8 which is connected to the mounting flange 9 which carries the printed circuit board 10 with the electronic circuit. Inside the bearing support 8 are a plurality of ball bearings 11 which support a rotor shaft 12. However, rotor shaft 12 may also be supported by other types of bearings, such as sintered spherical bearings.

FIG. 3 again illustrates the design of the stator 50 consisting of the yoke stack 3 and of the pole stacks 4. In the manner known per se, the sheet steel laminations of the pole stacks 4 are held together by means of a plurality of rivets 22 whereas the sheet steel laminations of the yoke stack 3 are held together by the bearing support 8 as seen in FIG. 6. The bearing support 8, for example, can be pressure-cast in one piece.

Figure 3:
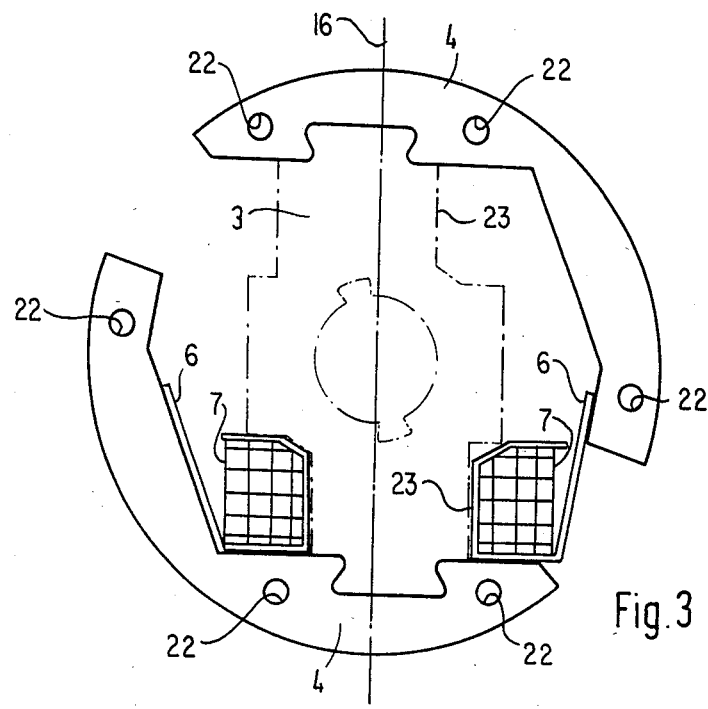

Also, FIG. 3 shows that a plurality of legs 23 of the yoke stack 3 which carry the coilforms 6 are asymmetrical in relation to the longitudinal stator axis 16.

Figure 4:
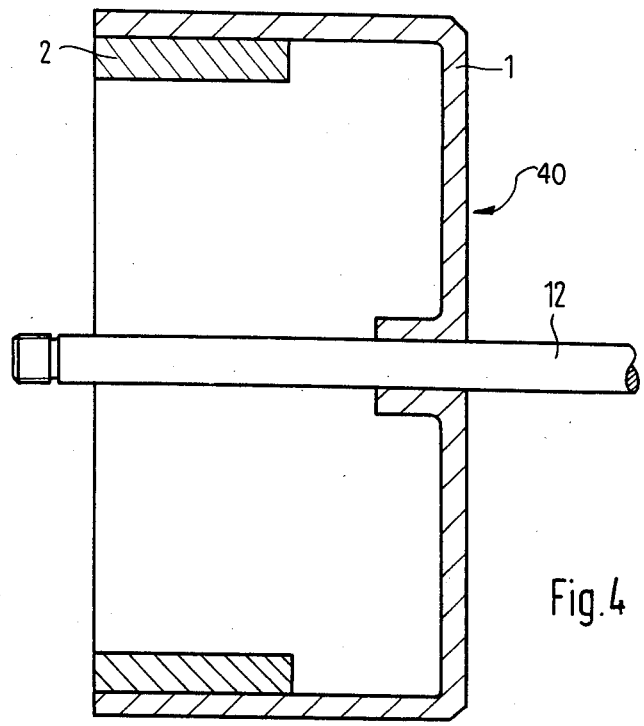

FIG. 4 shows the rotor 40 consisting of the dome-shaped body 1, the permanent magnet 2 and the rotor shaft 12.

FIGS. 5a through 5c show various views of the coilform 6. Two peculiarities of the coilform 6 are recognizable. The first is seen in a plurality of soldering pins 13 which are provided for in a joining piece 14 of the coilform 6. To a first end of the projecting soldering pins 13 there may be connected the ends of the stator winding 7, and to a second end of the soldering pins 13 there may be connected the conductors of the printed circuit board 10 in an electrically conducting manner. The second peculiarity resides in a plurality of flaps 15 of the coilform 6 which are turned onto the stator winding 7 during the assembly of the motor 30 (see FIGS. 5b and 5c).

Figure 7:
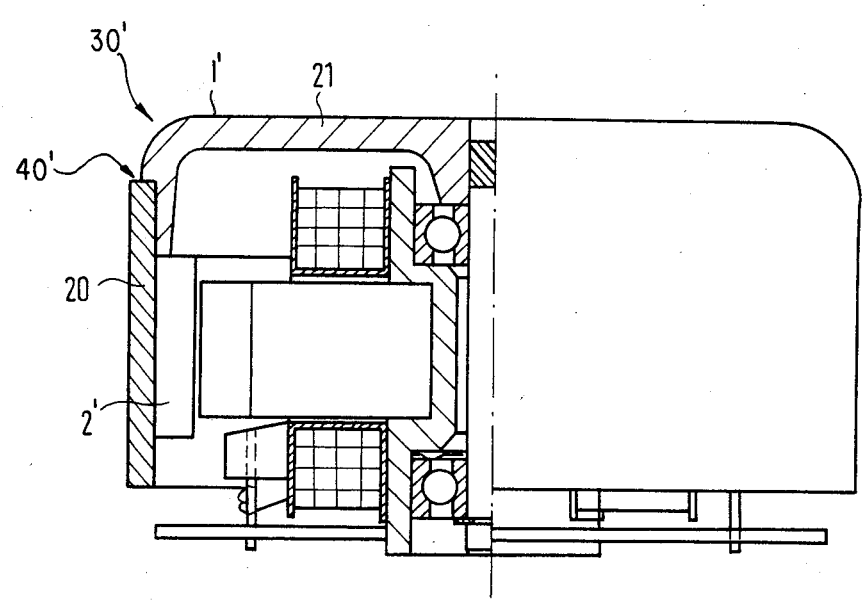

In an alternative embodiment of the motor 30' as shown in FIG. 7, the rotor 40' differs in that the dome-shaped body 1' consists of a cylinder 20 and of a bottom 21. The cylinder 20 represents the magnetic yoke of the permanent magnet 2', and thus it must be made of a magnetizable material. The bottom 21, however, can be made of a non-magnetizable material, such as of plastics or of pressure-cast aluminum.

The novel d.c. motor 30 has good starting properties. By thickening of the extensions 5, a favourable magnetic resistance value is provided within the extensions 5 so that the neutral zone 19 of the rotor 40 is aligned along the extensions 5 in the rest position of the motor 30. This results in the angle ε which is optimal with respect to the torque formation, so that a reliable starting of the motor 30 is always provided.

Moreover, the novel d.c. motor 30 consists of simple-design parts which can be partially manufactured and/or assembled with the aid of automatic machines.

We claim:

1. An electronically commutated direct current motor comprising, in combination:

said direct current motor including a rotor having a dome-shaped body comprised of magnetizable material having a permanent magnet disposed on an inner circumference of said dome-shaped body, said rotor being a bipolar external rotor;

a stator located within said permanent magnet and including a yoke and a plurality of pole stacks and further including a longitudinal stator axis providing a longitudinal axis of symmetry through said motor;

a plurality of coilforms carried by said yoke having a plurality of stator windings wound on said coilforms, said stator winding for providing an alternating current field, said stator having a double T-shaped design with said stator winding being disposed on a common leg of said double T-shaped stator, said pole stacks and said yoke with said stator windings wound thereon being disposed asymmetrical to said longitudinal stator axis;

a plurality of stator pole stack extensions projecting in the same circumferential direction and separated from said permanent magnet by a constant air gap, said air gap located between said stator and said rotor, said stator alternating current field having a polar axis staggered parallel to said longitudinal stator axis by a fixed distance and said rotor permanent magnet having a polar axis orthogonal to a rotor neutral zone and displaced from said stator alternating current polar axis by an angle epsilon when said stator winding is currentless;

a rotor shaft penetrating said dome-shaped body for turning an external load;

a printed circuit board mounted adjacent to said coilform and supported by a mounting flange within said dome-shaped body, said printed circuit board having an electronic circuit for providing commutation of an input signal; and a plurality of soldering pins mounted within a joining piece of said coilform for electrically connecting said stator windings to said printed circuit board, said coilform further including a plurality of flaps for turning onto said stator winding during assembly of said motor, and wherein said plurality of stator pole stack extensions having a magnetic resistance value which permits said rotor neutral zone to align with said plurality of stator pole stack extensions when said stator winding is currentless for providing an optimal starting torque.

2. The electronically commutated direct current motor of claim 1 wherein said permanent magnet comprises a plastics bound plate-shaped permanent magnet.

3. The electronically commutated direct current motor of claim 2 wherein said magnetizable material of said dome-shaped body comprises soft iron.

4. The electronically commutated direct current motor of claim 3 wherein said yoke and said plurality of pole stacks each are dovetailed fitting for providing a form-fit connection.

5. The electronically commutated direct current motor of claim 4 wherein said stator is mounted in a sleeve-shaped bearing support connected to said mounting flange.

6. The electronically commutated direct current motor of claim 5 wherein said bearing support includes a plurality of ball bearings for supporting said rotor shaft.

7. The electronically commutated direct current motor of claim 5 wherein said bearing support includes a plurality of sintered spherical bearings for supporting said rotor shaft.

8. The electronically commutated direct current motor of claim 6 wherein said pole stacks include a plurality of sheet steel laminations, said pole stack sheet steel laminations being coupled by a plurality of rivets.

9. The electronically commutated direct current motor of claim 8 wherein said yoke includes a plurality of sheet steel laminations, said yoke sheet steel laminations being coupled by said bearing support.

10. The electronically commutated direct current motor of claim 9 wherein said bearing support is pressure cast into a single piece.

11. The electronically commutated direct current motor of claim 10 wherein said yoke further includes a plurality of legs for supporting said plurality of coilforms.

12. The electronically commutated direct current motor of claim 11 wherein said plurality of soldering pins each have a first end and a second end, said first end for connecting to a first terminal connector located on said stator windings and said second end for connecting to a second terminal connector located on said printed circuit board.

13. An electronically commutated direct current motor comprising, in combination:
    said direct current motor including a rotor having a dome-shaped body with a permanent magnet disposed on an inner circumference of said dome-shaped body, said dome-shaped body further comprised of a cylinder and a bottom, said cylinder comprised of a magnetizable material and being a magnetic yoke for said permanent magnet, said bottom being comprised of a non-magnetizable material;
    a stator located within said permanent magnet and including a stator yoke and a plurality of pole stacks and further including a longitudinal stator axis providing a longitudinal axis of symmetry through said motor;
    a plurality of coilforms carried by said stator yoke having a plurality of stator windings wound on said coilforms, said stator windings for providing an alternating current field, said stator having a double T-shaped design with said stator winding being disposed on a common leg of said double T-shaped stator, said pole stacks and said stator yoke with said stator windings wound thereon being disposed asymmetrical to said longitudinal stator axis;
    a plurality of pole stack extensions projecting in the same circumferential direction and separated from said permanent magnet by a constant air gap located between said stator and said rotor, said stator alternating current field having a polar axis staggered parallel to said longitudinal stator axis by a fixed distance and said rotor permanent magnet having a polar axis orthogonal to a rotor neutral zone and displaced from said stator alternating current polar axis by an angle epsilon when said stator winding is currentless;
    a rotor shaft penetrating said dome-shaped body for turning an external load;
    a printed circuit board mounted adjacent to said coilform and having an electronic circuit for providing cummutation of an input signal;
    a plurality of soldering pins mounted within a joining piece of said coilform for electrically connecting said stator windings to said printed circuit board, said coilform further including a plurality of flaps for turning onto said stator winding during assembly of said motor, and wherein said plurality of pole stack extensions having a magnetic resistance value which permits said rotor neutral zone to align with said plurality of pole stack extensions when said stator winding is currentless for providing an optimal starting torque.

* * * * *